June 26, 1956  C. E. WEDDINGTON  2,751,958
ANTISKID CHAINS

Filed May 10, 1955  2 Sheets-Sheet 1

INVENTOR.
CHARLES E. WEDDINGTON
BY
McMorrow, Berman + Davidson
ATTORNEYS

June 26, 1956 C. E. WEDDINGTON 2,751,958
ANTISKID CHAINS
Filed May 10, 1955 2 Sheets-Sheet 2
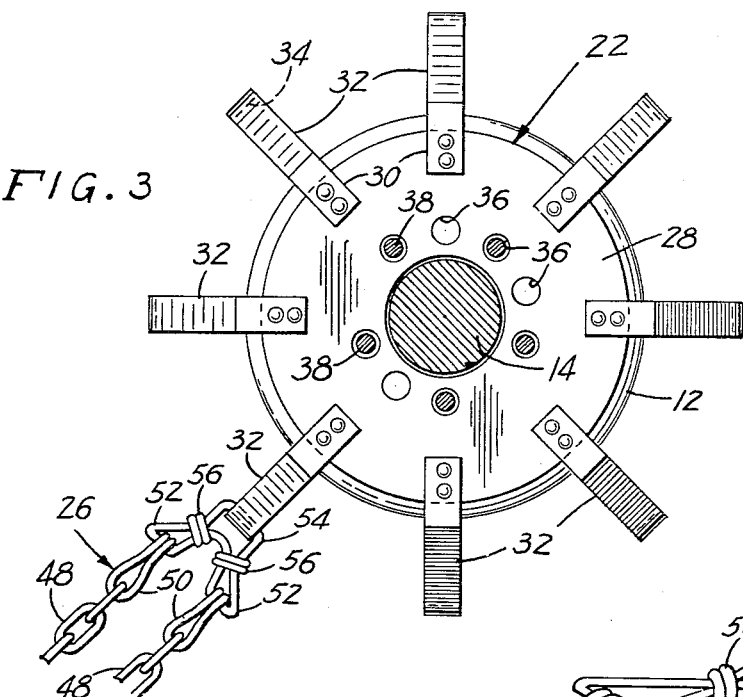
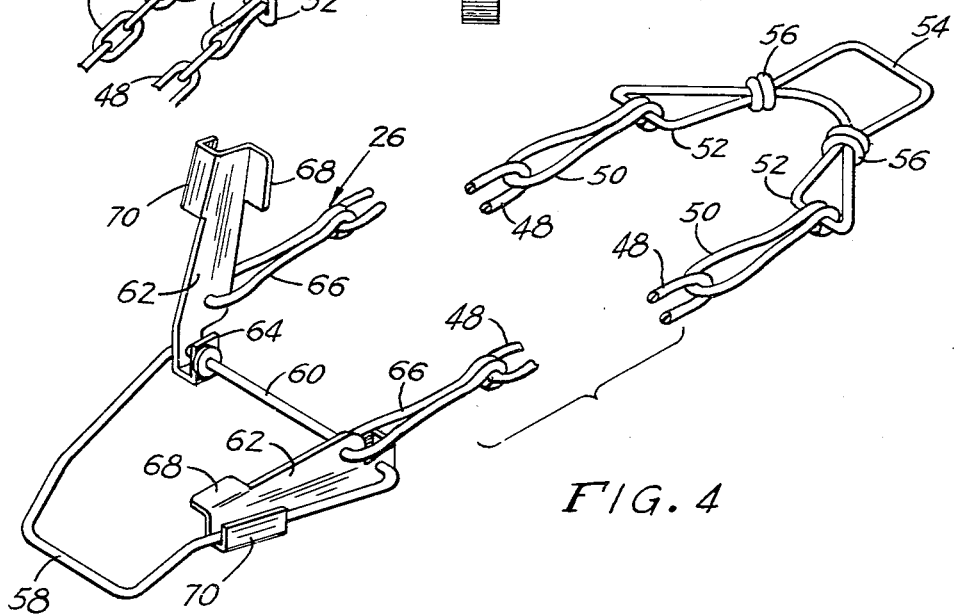
INVENTOR.
CHARLES E. WEDDINGTON
BY
McMorrow, Berman + Davidson
ATTORNEYS United States Patent Office 2,751,958
Patented June 26, 1956

2,751,958
ANTISKID CHAINS

Charles E. Weddington, Crest Line, Calif.

Application May 10, 1955, Serial No. 507,425

3 Claims. (Cl. 152—233)

This invention relates to an antiskid chain. Summarized briefly, the invention includes an inner disc having a circumferential series of radially, outwardly extending hooks, this disc being clampably engaged between the body of a vehicle wheel and the wheel drum; and outer disc fixedly connected to the wheel within the hub cap covered recess thereof, the outer plate also having radially, outwardly extending hooks; and a plurality of chain assemblies adapted to straddle the tread of the vehicle tire and readily attachable at their ends to selected hooks of the inner and outer plates, said assemblies when attached having tensioning means associated therewith for drawing the same taut across the tire tread.

Among objects of the invention are the following:

First, to facilitate the application or removal of the chain units or assemblies in minimum time and with maximum facility;

Second, to reduce measurably or eliminate the soiling of one's hands or clothes;

Third, to allow any number of the chain units to be used;

Fourth, to improve upon the chain tensioning device in a novel, commercially practicable, and yet simple way;

Fifth, to so shape and relatively arrange the parts as to impart substantial strength and ruggedness to the device without sacrificing lightness in weight and ease of application or removal;

Sixth, to permit mounting of the chain holding plates on the vehicle wheel without modification or redesign of a conventional, modern wheel in any way; and Seventh, to wholly conceal the inner and outer plates when the chains are not in use, in positions in which they can be left over the entire year and in which they will not damage adjacent conventional vehicle parts, such as wheel cylinders, brake lines, etc.

Other objects will appear from the following description, the claims appended thereto, and from the annexed drawing, in which like reference characters designate like parts throughout the several views, and wherein:

Figure 3 is a sectional view on line 3—3 of Figure 2, portions of the vehicle wheel not being shown; and Figure 4 is an enlarged, fragmentary perspective view of one of the chain units.

Figure 1:
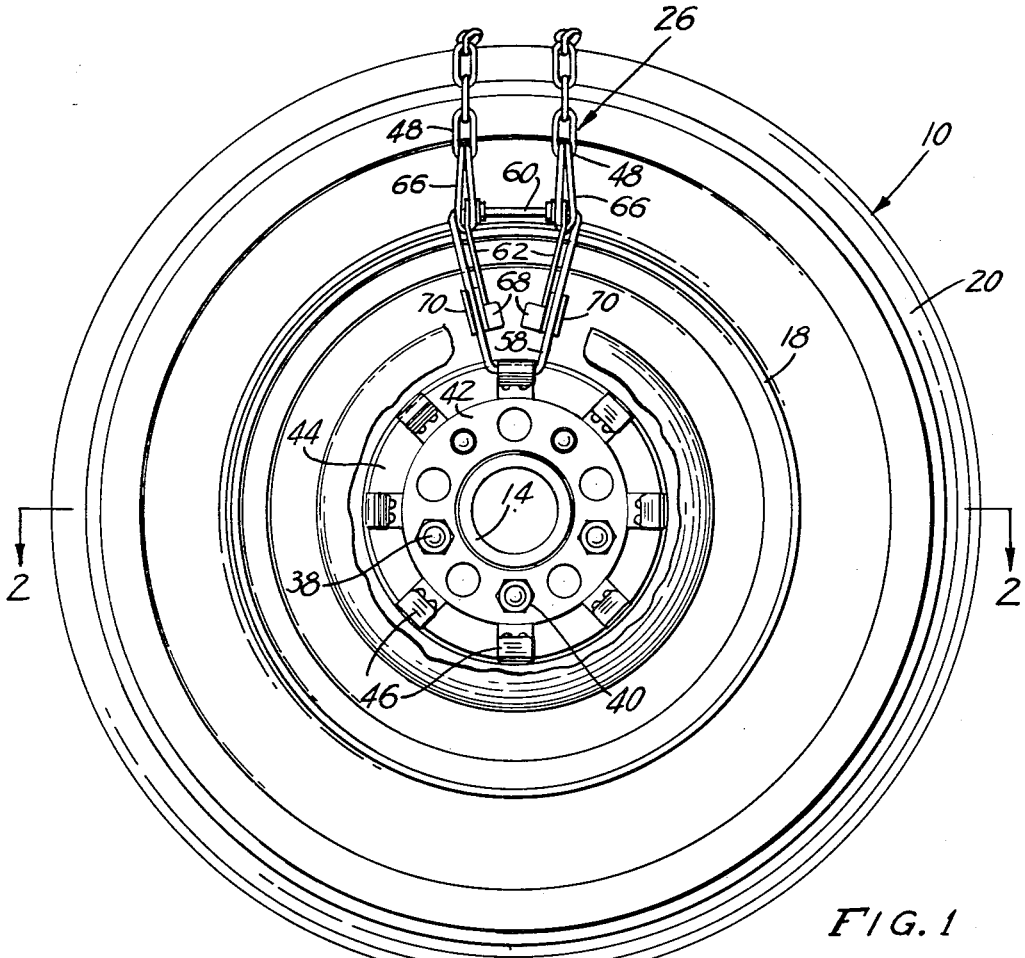
Figure 1 is an elevational view of a conventional automobile wheel equipped with an antiskid chain formed in accordance with the present invention, only one of a possible total of eight chain units being shown.
Figure 2:
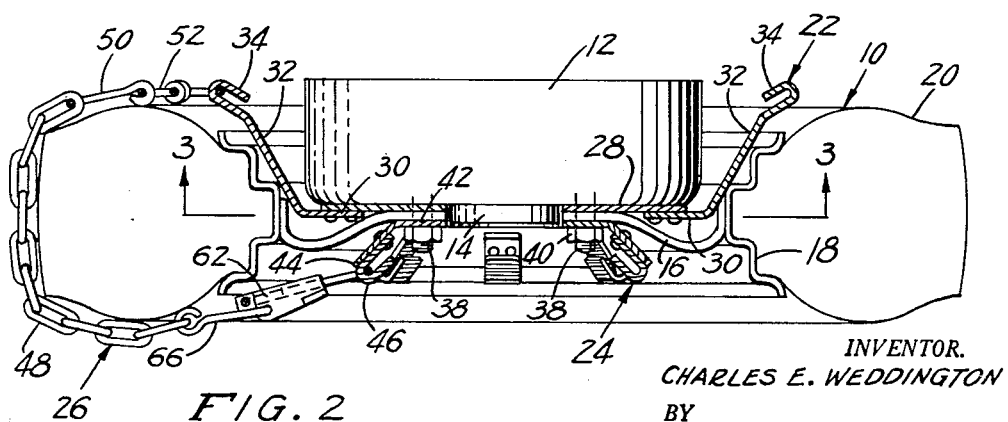
Figure 2 is a sectional view on line 2—2 of Figure 1.

A conventional, modern, automobile wheel 10 is illustrated as including a drum 12 having a hub 14. Formed with a center opening receiving the hub, and removably but fixedly secured to the drum by means of the usual studs and lug nuts, is the pressed steel body 16 of the wheel having fixed to its periphery the usual drop center rim 18, in which is seated the tire 20. All this is conventional and does not per se constitute the invention.

The antiskid chain device includes an inner anchor plate 22, an outer anchor plate 24, and at least one but not more than eight (in the illustrated example) chain units 26.

Inner anchor plate 22 includes a wholly planiform, circular plate member 28 having a center opening receiving hub 14.

Riveted to the marginal part of plate member 28, at equidistantly spaced locations about the plate member circumference, are the inner ends 30 of arms 32 terminating at their outer, free ends in hooks 34. The arms 32 are inclined in angular relation to the plane of plate member 28.

Spaced about the center opening of plate member 28 are stud receiving openings 36, through which project the studs 38 of the vehicle wheel, threaded to receive lugs 40. Apertures 36 are so arranged as to receive the studs of any of the various popular makes of automobile. For this purpose, the apertures are arranged in two rows, with three apertures in one and five in the other row as shown in Figure 3.

The outer anchor plate 24 has a planiform center portion or plate member 42 apertured to receive the hub 14, and a frustro conical marginal flange 44 integral with the center portion. Fixed to the flange are equidistantly spaced hooks 46 arranged in a circumferential series and facing inwardly of the plate member 42.

As a first step, one removes the vehicle wheel, at any convenient time and location before the onset of the snowy and icy weather. After the wheel body has been removed from the drum, the inner plate 22 is positioned against the drum, with the studs 38 extending through apertures 36. The arms 32 are disposed to extend toward the inner side of the vehicle wheel.

The wheel body 16 is now returned into proper position, upon studs 38. Then, the outer plate 24 is positioned against the outer surface of the body 16, and lugs 40 are threaded back onto studs 38 against the plate 24. Plates 22, 24 are thus fixedly secured to and rotate with the wheel, and would ordinarily not be visible under ordinary driving conditions, since the hub cap covers the outer plate 24 and the inner plate will be completely concealed in any event.

The plates are, however, ready for use whenever the chain units 26 are to be applied. Assuming that snowy or icy weather arrives, one need only apply the chain units to the inner and outer plates, without jacking up the wheel, driving the vehicle over the chains, using tools, or kneeling down or otherwise inconveniencing oneself.

Each chain unit includes a pair of chain link sections 48 having at one end connecting links 50 terminating in hooks engaged about portions of side loops 52 of an end connector means including also a main loop 54. The end connector means can be formed from an endless length of wire material, bent to include the three loops 52, 52, 54. After being so bent, the length of material is retained in its selected shape by twisting short lengths of wire 56 about the contacting, loop defining portions of said length of wire.

At their other ends, the sections 48 are connected to a single, trapezoidal connecting wire loop 58 having a base portion 60 on which are swingably mounted tensioning arms 62 the inner ends of which have reversely bent portions 64 apertured for extension of the base part 60 therethrough. In spaced relation to their inner ends, arms 62 are apertured to receive end links 66 of the chain link section 48. Therefore, when the arms 62 are in one position in which they project outwardly from the general plane of the loop 60, the sections 48 will be slackened to facilitate application or removal of the chain units. When swung into the general plane of loop 60 and lockably engaged with the loop, each arm 62 tensions the associated chain section 48 by pulling the link 66 about the axis of the arm.

At their free ends, the arms 62 have laterally projecting finger grips 68, as well as channel portions 70. Portions 70 receive the sides of the loop 58 in the locked, chain tensioning positions of the arms 62. The arms are pivoted on base part 60 sufficiently loosely as to permit a certain amount of lateral movement of the arms to facilitate their being engaged under the loop sides.

In the illustrated example, one can use up to eight of the chain units 26 and might use, for example, two, three, four or possibly the full eight. Each chain unit is attached easily to the anchor plates. With arms 62 in their unlocked positions, the loop 54 and loop 58 are engaged with selected, corresponding hooks 34, 46 of the respective plates, in a chain unit position in which the sections 48 straddle the tire tread. The arms 62 are now swung to their locked positions, and this tensions the sections 48 over the tire tread. The device is now ready for use, without requirement of jacking up the wheel, driving the vehicle over the chains, soiling one's clothes, or consuming excessive time in the operation. Of course, when the chains are in use, the hub cap of the wheel is removed and is left off until such time as the chain units are taken off.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An antiskid device for a vehicle wheel having a wheel body, a tire, a drum to which the body is removably affixed, and studs projecting from the drum, comprising: an inner anchor plate engageable between one face of the wheel body and said drum; an outer anchor plate engageable against the opposite face of the wheel body, each plate having near its center an annular series of stud receiving apertures and including at its margin, a circumferential series of hook elements; and at least one chain unit connectible between the plates in position to straddle the tire and including means at its ends engageable with selected hook elements of the plates.

2. An antiskid device for a vehicle wheel having a wheel body, a tire, a drum to which the body is removably affixed, and studs projecting from the drum, comprising: an inner anchor plate engageable between one face of the wheel body and said drum; an outer anchor plate engageable against the opposite face of the wheel body, each plate having near its center an annular series of stud receiving apertures and including, at its margin, a circumferential series of hook elements, the elements of one plate lying in a common plane paralleling the general plane of the wheel body at one side of said body, and the elements of the other plate lying in a common plane paralleling the general plane of the wheel body at the opposite side of the wheel body; and at least one chain unit connectible between the plates in position to straddle the tire and including means at its ends engageable with selected ones of the hook elements of the plates.

3. An antiskid device for a vehicle wheel having a wheel body, a tire, a drum to which the body is removably affixed, and studs projecting from the drum, comprising: an inner anchor plate engageable between one face of the wheel body and said drum; an outer anchor plate engageable against the opposite face of the wheel body, each plate having near its center an annular series of stud receiving apertures and including, at its margin, a circumferential series of hook elements, the elements of one plate lying in a common plane paralleling the general plane of the wheel body at one side of said body, and the elements of the other plate lying in a common plane paralleling the general plane of the wheel body at the opposite side of the wheel body; and at least one chain unit connectible between the plates in position to straddle the tire and including means at its ends engageable with selected ones of the hook elements of the plates, said chain unit being formed with a pair of side by side chain link sections connected between the hook element engaging means at the ends of the unit, said unit further including tensioning arms pivoted on one of said end means of the unit and connected, at a location spaced from the pivot axes of the arms, to one end of the chain link sections, whereby to swing the arm attached portions of the chain link sections about the pivot axes of said arms to tension the sections in their tire straddling position, said arms including means to releasably engage the same against pivotal movement in at least one direction in their section tensioning positions.

References Cited in the file of this patent
UNITED STATES PATENTS

| 1,530,956 | Reed | Mar. 24, 1925 |
| 2,729,262 | Lohmiller | Jan. 3, 1956 |

FOREIGN PATENTS

| 813,291 | France | Feb. 22, 1937 |